United States Patent [19]

Yui et al.

[11] 4,067,847

[45] Jan. 10, 1978

[54] SELF-EXTINGUISHING RESIN COMPOSITION

[75] Inventors: Hiroshi Yui; Saburo Moriwaki; Yukihiro Ichikawa; Shigekazu Ohi, all of Yokkaichi, Japan

[73] Assignee: Mitsubishi Petrochemical Co., Ltd., Tokyo, Japan

[21] Appl. No.: 623,491

[22] Filed: Oct. 17, 1975

[30] Foreign Application Priority Data

Oct. 18, 1974 Japan .............................. 49-120083
Jan. 17, 1975 Japan .................................. 50-7536

[51] Int. Cl.$^2$ ........................ C08K 3/04; C08K 3/22
[52] U.S. Cl. ............................ 260/45.7 R; 260/42.44; 260/42.45; 260/DIG. 24; 264/211; 264/328
[58] Field of Search ............ 260/45.7 R, 42.45, 42.46, 260/42.43, 42.44; 264/211; 106/15 FP

[56] References Cited

U.S. PATENT DOCUMENTS

| 3,574,644 | 4/1971 | Olstowski et al. | 260/45.7 |
| 3,816,367 | 6/1974 | Larkin et al. | 260/29.6 |
| 3,862,070 | 1/1975 | Fukushima et al. | 260/28.5 |
| 3,912,671 | 10/1975 | Kondo et al. | 260/23 |
| 3,919,164 | 11/1975 | Hattori et al. | 260/42.43 |
| 3,923,705 | 12/1975 | Smith | 260/2.5 |
| 3,953,565 | 4/1976 | Mizutani et al. | 246/210 |

FOREIGN PATENT DOCUMENTS 1,080,468   8/1967   United Kingdom.

Primary Examiner—Donald E. Czaja
Assistant Examiner—R. A. White
Attorney, Agent, or Firm—Oblon, Fisher, Spivak, McClelland & Maier

[57] ABSTRACT

A self-extinguishing resin composition comprises 55 – 25 wt. % of a thermoplastic resin and 45 – 75 wt. % of magnesium hydroxide, wherein said magnesium hydroxide has a specific surface area of less than or equal to 45 m$^2$/g. Such a composition is not subject to formation of a silver-colored streak upon being extrusion- or injection-molded.

7 Claims, No Drawings

SELF-EXTINGUISHING RESIN COMPOSITION

BACKGROUND OF THE INVENTION

1. Field of the Invention

The present invention relates to a self-extinguishing resin composition comprising a thermoplastic resin and magnesium hydroxide which is not susceptible to silver-colored streaking during extrusion or injection molding.

2. Description of the Prior Art

Recently, the demand for flame-proof materials useful in household electric products has been increased. Blending with antimony trioxide, halides, or vinyl chloride resins, or copolymerizing with vinyl chloride monomer and the like, have been known as methods for flame-proofing thermoplastic resins. However, a significant disadvantage is the attendant formation of toxic and corrosive gases upon combustion of such products.

In the past, self-extinguishing resin compositions have been prepared based upon polypropylene and/or polyethylene which contain more than 45 wt. % of aluminum hyroxide, magnesium hydroxide, or a complex of magnesium hydroxide and magnesium carbonate. Especially favorable are the self-extinguishing resin compositions which comprise 55 – 25 wt. % of a polyolefin, 45 – 75 wt. % of magnesium hydroxide and a metal salt of a fatty acid. Such compositions are extruded for molding in order to control the melt index to lower than a predetermined value. When magnesium hydroxide is combined with a polyolefin, the resultant product is flame-retardant, does not form a toxic gas upon combustion and displays no toxicity caused by the magnesium hydroxide additive. Accordingly, the composition is remarkably advantageous as a self-extinguishing resin composition. On the other hand, it is difficult to control the fluidity of such a composition in the molten state in a range suitable for the application of conventional molding methods such as injection molding or extrusion molding. Moreover, the appearance of the resulting molded product is undesirable, especially as regards the formation of a silver-colored streak.

There are several other basic principles well known in the art. It is common knowledge that the flame-retarding property of a thermoplastic resin is decreased by blending carbon black, a fine carbon powder. Also, when a large amount of an inorganic filler is blended with a thermoplastic resin, the flame-retarding property is increased. When magnesium hydroxide is blended, the flame-retarding property is remarkably high, but if ignited, the blended composition will burn. Consequently, there remains a need for a fire-retardant composition which is suitable for molding.

SUMMARY OF THE INVENTION

Accordingly, it is an object of this invention to provide a self-extinguishing resin composition which has normal fluidity, especially which has improved fluidity in its molten state and from which a molded article especially having desirable appearance can be fabricated, lacking the silver-colored streak which is caused by molding a conventional fire-retardant blend of magnesium hydroxide with a thermoplastic resin.

It is another object of this invention to provide a self-extinguishing resin composition which has no toxicity and which does not form a toxic gas upon combustion.

It is still another object of this invention to provide a self-extinguishing resin composition which has a flame-retarding property superior to that of a conventional composition of a thermoplastic resin and magnesium hydroxide.

Briefly, these and other objects of this invention, as will hereinafter become clear from the ensuing discussion, have been attained by providing a self-extinguishing resin composition which comprises 55 – 25 wt. % of a thermoplastic resin having a melt index of 10 – 0.1 g/10 min. and 45 – 75 wt. % of magnesium hydroxide wherein the magnesium hydroxide has a specific surface area of less than 45 m$^2$/g. Use of this special magnesium hydroxide prevents the formation of a silver-colored streak after extrusion-molding or injection-molding of the composition. This invention also provides a self-extinguishing resin composition which comprises 0.05 – 20 wt. parts of a fine carbon powder for every 100 wt. parts of the thermoplastic resin and magnesium hydroxide.

DETAILED DESCRIPTION OF THE PREFERRED EMBODIMENTS

The surface area of magnesium hydroxide to be used in a specific case is dependent upon the melt index of the thermoplastic resin used. The following are the ranges of the optimum values:

| For Extrusion-molding: | |
| --- | --- |
| Optimum Specific Surface Area of Magnesium hydroxide (m$^2$/g) | Melt Index of Thermoplastic Resin (g/10 min.) |
| 38 – 45 | more than 8 |
| 40 – 33 | 8 – 4 |
| 36 – 28 | 4 – 1 |
| 32 – 25 | 1 – 0.1 |
| For Injection Molding: | |
| 30 – 22 | more than 10 |
| 25 – 18 | 10 – 6 |
| 22 – 10 | 6 – 3 |
| less than 20 | 3 – 1 |

These values are especially suitable for the thermoplastic resin, polypropylene. As can be seen, the optimum specific surface area decreases with decreasing melt index of the resins.

Suitable thermoplastic resins for use in this invention include: polypropylene, propylene-ethylene copolymer, polyethylene, ethylenepropylene copolymer, ethylene-vinyl acetate copolymer, polystyrene, acrylonitrile-butadiene-styrene copolymer, acrylonitrile-styrene copolymer and the like. Especially suitable are polyolefins such as polypropylene, propylene-ethylene block or random copolymers, high-density or low-density polyethylene and the like since no toxic or corrosive gases are emitted during combustion.

Suitable magnesium hydroxide for use in this invention is that having a specific surface area of less than or equal to 45 m$^2$/g; preferably 25 – 45 m$^2$/g, and especially 30 – 40 m$^2$/g, for use in products to be extrusion-molded; and preferably lower than 30 m$^2$/g, especially lower than 20 m$^2$/g, for use in products to be injection-molded. The specific surface area is measured by adsorbing nitrogen on the surface of a sample at liquid nitrogen temperatures (see, for example, "Funtai no Sokutei," Page 123, Published Sangyo Tosho). Suitable magnesium hydroxide having an appropriately low specific surface area can be prepared by utilizing vigorous stirring when an alkali hydroxide such as sodium hydroxide or potassium hydroxide is added to a concentrated bittern and/or seeds of magnesium hydroxide.

The reaction mixture is then allowed to stand still at 60° - 100° C, preferably 70° - 80° C, for a long period of time. In the conventional method, an alkali hydroxide is added to sea water or a bittern with slow stirring. The mixture is then aged at from room temperature up to 60° C. The specific surface area of the resulting conventional magnesium hydroxide is high, e.g., 60 - 110 m²/g and is very non-uniform. As a result, compositions having stable fluidities are difficult to obtain. In accordance with the above-mentioned improved method, the specific surface area of magnesium hydroxide can be decreased and the fluctuations in this property can also be decreased. The desirable composition of this invention can be obtained by using such a special magnesium hydroxide having a low specific surface area which is uniform. The differences of the improved method from the conventional method are shown in the table below.

|  | Improved method | Conventional method |
| --- | --- | --- |
| Starting material | concentrated bittern and/or seeds of Mg(OH)₂ | sea water or bittern |
| Type of Stirring | vigorous | slow |
| Time of Aging | 60 - 96 hours | 12 hours |
| Temperature for aging | 70 - 80° C | room temperature 60° C |
| Specific surface area of magnesium hydroxide (average) | 20 - 40 m²/g 10 - 25 m²/g | 60 - 110 m²/g |

The average diameter of magnesium hydroxide to be used in this invention is not critical and can be selected using conventional considerations. It is usually in the range of 0.1 - 50 $\mu$m, preferably 0.5 - 30 $\mu$m.

The following additives can also be included in the composition of this invention: antioxidants, ultraviolet absorbing agents, copper toxicity inhibitors; various pigments, such as titanium oxide, carbon black, and the like; lubricants, such as metal salts of fatty acids, e.g., calcium stearate, paraffin wax, fatty esters, e.g., esters of polyhydric alcohol, such as glycerine and the like; dispersing agents, such as stearic amide; and inorganic fillers, such as calcium carbonate, calcium oxide, talc, clay, diatomaceous earth, zinc oxide, volcanic pumice, barium sulfate, magnesium carbonate, magnesium oxide, glass fiber and the like which should be used in limited amounts to prevent a significant decrease of the flame-retarding property imparted by the magnesium hydroxide. In order to improve the impact strength and similar properties, it is possible to add a rubber component such as ethylene-propylene rubber, isoprene, chloroprene and the like.

In blending the components, conventional blending machines such as a roller mill, a Bumbury's mixer, a single axial extruder, a biaxial extruder and the like can be used. The temperature used in the blending should be higher than the softening point of the thermoplastic resin and lower than the thermal decomposition temperature of magnesium hydroxide.

In accordance with this invention, it is possible to prevent the disadvantages of inferior fluidity, unstability and the formation of a silver-colored streak caused by extrusion or injection-molding by the addition of magnesium hydroxide whereby a thermoplastic resin is rendered self-extinguishing. Moreover, molded products having desirable appearance and self-extinguishing properties can be effectively prepared by extrusion or injection molding. In one embodiment, magnesium hydroxide having an average diameter of 0.1 - 50 $\mu$m, preferably 0.2 - 20 $\mu$m, especially 0.2 - 2 $\mu$m is used. The surface of the magnesium hydroxide can be modified as desired and this property is not critical. The modification of the surface can be attained by adding a modifier such as a surfactant during the preparation. However, it is preferred to modify the surface by a mechanochemical method using a monomer or an oligomer. In another embodiment of this invention, a fine carbon powder is blended with the thermoplastic resin and the magnesium hydroxide. The fine carbon powder to be used in this invention comprises more than 70 wt. % of a carbon component and has an average diameter of 1m$\mu$m - 10 $\mu$m. Suitable powders include active carbon, carbon black, graphite and the like. The proportions of the thermoplastic resin relative to the amount of magnesium hydroxide can be in the range of 65 - 20 wt. % to 35 - 80 wt. %, and is usually in the range of 55 - 25 wt. % to 45 - 75 wt. %. The amount of the fine carbon powder should be 0.05 - 20 wt. parts for 100 wt. parts of the total of the thermoplastic resin and magnesium hydroxide. When the amount is less than 0.05 wt. part, an improvement in the flame-retardant property does not occur. When it is more than 20 wt. parts, the moldability of the composition is inferior. The fine carbon powder can be blended by the conventional blending methods described above.

The relationship between the amount of the fine carbon powder added and the self-extinguishing property will be illustrated as follows. The amount of magnesium hydroxide is given as a percentage. The amount of the carbon fine powder added is given in weight parts relative to 100 wt. parts of the thermoplastic resin and magnesium hydroxide. The thermoplastic resins include polyolefins, e.g., polypropylene, polyethylene, ethylene-propylene copolymer and the like.

1. 35 wt. % of Magnesium Hydroxide

Flammability is improved to a rating of self-extinguishing in the ASTM D-635 test by adding more than 3 wt. parts of carbon powder.

2. 43 wt. % of Magnesium Hydroxide

The HB is improved to a V-1 rating in the UL-94 vertical test (3.2 mm thickness) by adding more than 3 wt. parts of carbon powder. The self-extinguishment is improved to a grade of non-flammable in the ASTM D-635 test by adding more than 5 wt. parts of carbon powder.

3. 48 wt. % of Magnesium Hydroxide

The HB is improved to a V-1 rating in the UL-94 vertical test (3.2 mm thickness) by adding more than 0.5 wt. part of carbon powder. The HB is improved to a V-1 rating in the same test (2.5 mm thickness) by adding more than 3 wt. parts of carbon powder.

4. 53 wt. % of Magnesium Hydroxide

The HB is improved to a V-1 rating in the same test (2.5 mm thickness) by adding 0.1 wt. part of carbon powder. The V-1 is improved to a V-0 rating in the same test (3.2 mm thickness) by adding more than 0.3 wt. part of carbon powder. The HB is improved to a V-1 rating in the same test (2.0 mm thickness) by adding more than 3.0 wt. parts of carbon powder.

5. 63 wt. % of Magnesium Hydroxide

The HB is improved to a V-1 rating in the same test (2.0 mm thickness) by adding 0.05 wt. part of carbon powder. The HB is improved to a V-0 rating in the same test (2.0 mm thickness) by adding more than 3.0 wt. parts of carbon powder.

The improvement in the flame-retardant effect by the addition of the fine carbon powder results from a synergistic effect on the thermal decomposition of magnesium hydroxide in the thermoplastic resin by the fine carbon powder. Such an effect is not found when a silica gel having a large specific surface area is added instead of the fine carbon powder. This fact supports the role of synergism of the fine carbon powder in the thermal decomposition of magnesium hydroxide. It is believed that the mechanism involves the formation of a non-flammable surface film in combustion by a complicated interaction of the fine carbon powder with the hydroxyl group of magnesium hydroxide, whereby internal combustion is prevented.

Having generally described the invention, a more complete understanding can be obtained by reference to certain specific examples, which are provided herein for purposes of illustration only and are not intended to be limiting unless otherwise specified.

MAGNESIUM HYDROXIDE (IMPROVED METHOD)

Preparation No. 1

In a 2 liter flask, 1 liter of a bittern (magnesium content of 3.25 wt. %) was charged, and 270 ml of an equivalent amount of an aqueous solution of sodium hydroxide was added dropwise to the bittern with stirring during 60 hours. The temperature in the flask was maintained at 70° C. After the addition, the mixture was allowed to stand for 4 hours. The precipitate was separated, dried and crushed. The specific surface area measured was 34 $m^2/g$.

MAGNESIUM HYDROXIDE (IMPROVED METHOD)

Preparation No. 2

In a 2 liter flask, 500 ml of the bittern of Preparation No. 1 was admixed with 1.5 wt. % of a slurry of magnesium hydroxide having a solid content of 32 wt. %. The specific surface area of the magnesium hydroxide in the solid component was 63 $m^2/g$. This was produced by adding dropwise 17.5 ml of calcium hydroxide containing an equivalent amount relative to 500 ml of sea water (magnesium content of 0.13 wt. %) during 12 hours. Thereafter, the mixture was kept for 4 hours and the supernatant liquid was separated. 270 ml of an equivalent amount of calcium hydroxide was added dropwise to the mixture with stirring during 96 hours. The temperature in the flask was maintained at 80° C. After the addition, the mixture was allowed to stand for 4 hours. The precipitate was separated, dried and crushed. The specific surface area measured was 19 $m^2/g$.

MAGNESIUM HYDROXIDE (CONVENTIONAL METHOD)

Preparation No. 3

In a 2 liter flask, 500 ml of sea water (magnesium content of 0.13 wt. %) was charged, and 17.5 ml of an equivalent amount of an aqueous solution of calcium hydroxide was added dropwise to the sea water with stirring during 6 hours at 50° C. After the addition, the mixture was allowed to stand for 4 hours. The precipitate was separated, dried and crushed. The specific surface area measured was 85 $m^2/g$.

MAGNESIUM HYDROXIDE (CONVENTIONAL METHOD)

Preparation No. 4

Preparation No. 3 was repeated except for using a bittern (magnesium content of 3.25 wt. %) instead of sea water to produce magnesium hydroxide. The specific surface area measured was 47 $m^2/g$.

EXAMPLE 1

40 wt. % of polypropylene (MI = 8 g/10 min.), 60 wt. % of magnesium hydroxide having a specific surface area of 19 $m^2/g$ (Preparation No. 2) and a lubricant of calcium stearate in a ratio of 1.8 wt. parts to 100 wt. parts of the total components were blended and pelletized to obtain a composition having an MI of 1.5 g/10 min. Pellets of the composition were injection-molded at 250° C under a primary pressure of 820 kg/$cm^2$ by an injection-molding machine. The moldability of the composition, the appearance of the molded product and extrusion moldability were all good. On the other hand, magnesium hydroxide having a specific surface area of 34 $m^2/g$ (Preparation No. 1) was used in the same formulation and the mixture was blended and pelletized under the same conditions to obtain a composition having an MI of 0.05 g/10 min. When the pellets of the composition were used, the injection moldability was slightly inferior (a primary pressure of more than 950 kg/$cm^2$ was required) and a silver-colored streak appeared on the surface, deteriorating the appearance although the extrusion moldability was good. The combustibility of the molded product was 94 V-0. On the other hand, magnesium hydroxide having a specific surface area of 85 $m^2/g$ or 47 $m^2/g$ (Preparation No. 3 and No. 4) was used in the same formulation and the mixture was blended and pelletized under the same conditions. A composition having an MI of less than 0.01 g/10 min. was obtained and was difficult to use for either injection molding or extrusion molding.

EXAMPLE 2

Magnesium hydroxide having the various specific surface areas shown in Table 1 and polypropylene, propylene-ethylene copolymer, high density polyethylene or polystyrene as also shown in Table 1 were blended and pelletized. Injection-molding and extrusion-molding were conducted using pellets of each composition. The results are shown in Table 1. When using magnesium hydroxide having a specific surface area of more than 45 $m^2/g$, prepared by the conventional method, both the injection-molding and the extrusion-molding were difficult to perform. When using magnesium hydroxide having a specific surface area of less than 45 $m^2g$ (34 $m^2/g$ and 19 $m^2/g$) prepared by the improved method, injection-molding could be performed. When magnesium hydroxide having a specific surface area of less than 20 $m^2/g$ (19 $m^2/g$) was used, no silver-colored streaks were found on the surface of the molded product, giving a good appearance. The combustibility of the product was self-extinguishing.

Table 1

| | Resin | | Magnesium hydroxide | | | Molding | | | Fluidity | Combustibility | |
| | | | | Speci. surf. | | Extrusion | Injection | | | UL 94 | ASTM D-635 |
| | Type | Wt. % | Prep. No. | area (m²/g) | Wt. % | mold-ability | mold-ability | appea-rance | MI g/10 min. | 3.2mm thick. | 2 mm thick. |
|---|---|---|---|---|---|---|---|---|---|---|---|
| Exp. | Polypropyrene | 55 | 1 | 34 | 45 | good | fair | bad | 0.2 | 94 HB | self-ext. |
| " | " | 55 | 2 | 19 | 45 | fair | good | good | 2.7 | " | " |
| " | " | 40 | 1 | 34 | 60 | good | fair | bad | 0.03 | 94 V-O | " |
| " | " | 40 | 2 | 19 | 60 | good | good | good | 0.8 | " | " |
| Ref. | " | 55 | 3 | 85 | 45 | not moldable | not moldable | — | <0.01 | 94 HB | self-ext. |
| " | " | 55 | 4 | 47 | 45 | " | " | — | " | " | " |
| " | " | 40 | 3 | 85 | 60 | " | " | — | " | 94 V-O | " |
| " | " | 40 | 4 | 47 | 60 | " | " | — | " | " | " |
| Exp. | P-E copolymer | 55 | 1 | 34 | 45 | good | fair | bad | 0.1 | 95 HB | self-ext. |
| " | " | 55 | 2 | 19 | 45 | fair | good | good | 2.1 | " | " |
| " | " | 40 | 1 | 34 | 60 | good | fair | fair | 0.02 | 94 V-O | " |
| " | " | 40 | 2 | 19 | 60 | good | good | good | 0.7 | " | " |
| Ref. | P-E copolymer | 55 | 3 | 85 | 45 | not moldable | not moldable | — | <0.01 | 94 HB | self-ext. |
| " | " | 55 | 4 | 47 | 45 | " | " | bad | " | " | " |
| " | " | 40 | 3 | 85 | 60 | " | " | — | " | 94 V-O | " |
| " | " | 40 | 4 | 47 | 60 | " | " | — | " | " | " |
| Exp. | HDPE | 55 | 1 | 34 | 45 | good | fair | bad | 0.09 | 94 HB | self-ext. |
| " | " | 55 | 2 | 19 | 45 | fair | good | good | 1.8 | " | " |
| " | " | 40 | 1 | 34 | 60 | good | fair | bad | 0.01 | 94 V-O | " |
| " | " | 40 | 2 | 19 | 60 | good | good | good | 0.6 | " | " |
| Ref. | " | 55 | 3 | 85 | 45 | not moldable | not moldable | — | <0.01 | 94 HB | self-ext. |
| " | " | 55 | 4 | 47 | 45 | " | " | — | " | " | " |
| " | " | 40 | 3 | 85 | 60 | " | " | — | " | 94 V-O | " |
| " | " | 40 | 4 | 47 | 60 | " | " | — | " | " | " |
| Exp. | polystyrene | 55 | 1 | 34 | 45 | good | fair | bad | 0.2 | 94 HB | self-ext. |
| " | " | 55 | 2 | 19 | 45 | good | good | good | 2.3 | " | " |
| " | " | 40 | 1 | 34 | 60 | good | fair | bad | 0.01 | 94 V-O | non-flame |
| " | " | 40 | 2 | 19 | 60 | good | good | good | 0.5 | " | " |
| Ref. | " | 55 | 3 | 85 | 45 | not moldable | not moldable | — | <0.01 | 94 HB | self-ext. |
| " | " | 55 | 4 | 47 | 45 | " | " | — | " | " | " |
| " | " | 40 | 3 | 85 | 60 | " | " | — | " | 94 V-O | non-flame |
| " | " | 40 | 4 | 47 | 60 | " | " | — | " | " | " |

Note:
Exp.: example
Ref.: reference
P-E copolymer: propyrene-ethylene copolymer
HDPE: high density polyethylene
Prep. No.: Preparation No.
Speci. surf. area: specific surface area
self-ext.: self-extinguishing
non-flame: non-flammable

EXAMPLE 3

1. A mixture of magnesium hydroxide having an average diameter of 0.4 μm and polypropylene was blended with several fine carbon powders in various ratios. Each mixture was press-molded and the combustibility (flame retarding property) of each product was measured. As shown in Table 2, the flame retarding property of the products were remarkably improved by the addition of the fine carbon powder. As a reference, the properties of compositions containins silica gel instead of carbon powder are included.

2. A 100 wt. part sample of a mixture of 50 wt. % of magnesium hydroxide having an average diameter of 0.3 μm and 50 wt % of each of several thermoplastic resins were blended with 2 wt. parts of carbon black having an average diameter of 100 mμm using a roller mill. The mixture was press-molded and the commbustibility of the product was measured. As a reference, the combustibility of a product not containing carbon black was also measured. As shown in Table 3, the flame retarding property was remarkably improved by the addition of carbon black.

3. A 100 wt. part sample of a mixture of 50 wt. % of magnesium hydroxide having an average diameter of 0.8 μm aluminum hydroxide or a complex of magnesium hydroxide and magnesium carbonate and 50 wt. % of propylene-ethylene copolymer were blended with 2 wt. parts of carbon black having an average diameter of 100 μm, using a roller mill. The mixture was press-molded and the combustibility of the product was measured. As a reference, the properties of a composition not containing carbon black were also measured. As shown in Table 4, the flame retarding property of the product was remarkably improved by the addition of carbon black.

4. A mixture of 43 wt. % of propylene-ethylene block copolymer, 55 wt. % of magnesium hydroxide having an average diameter of 0.4 μm and 2 wt. % of aluminum stearate were blended with 1 wt. part of carbon black having an average diameter of 100 mμm for every 100 wt. parts of propylene-ethylene block copolymer and magnesium hydroxide. The blended product was molded by the following three methods, and the combustibility of the products was measured.

1. Pellets obtained by kneading the three components were injection-molded by a biaxial extruder.
2. Pellets prepared by blending the polymer and magnesium hydroxide were dry-blended with a master batch of pellets prepared by kneading the polymer and carbon black with a Bambury's mixer. The mixture was injection-molded by a biaxial extruder.

3. Pellets prepared by blending the polymer and magnesium hydroxide were dry-blended and the mixture was injection-molded by a biaxial extruder.

As a reference, 43 wt. % of propylene-ethylene block copolymer, 55 wt. % of magnesium hydroxide and 2 wt. % of stearic acid were blended and pelletized. The pellets were injection-molded and the combustibility of the product was measured. As shown in Table 5, the product containing carbon black had a superior flame retarding property relative to the properties of the products containing no carbon black in any of methods (1), (2), or (3).

REFERENCE EXAMPLE

In order to confirm that the improved flame retarding property resulting from the addition of the fine carbon powder is a special phenomenon unique for thermoplastic resin-inorganic oxide systems, the following tests were conducted. A typical non-flammable thermoplastic resin having the following composition was used:

| | |
|---|---|
| Propylene | 75 wt. % |
| Antimony trioxide | 5 wt. % |
| Chlorinated polyethylene | 20 wt. % |

A carbon black having an average diameter of 30 m$\mu$m was blended with this composition and the combustibility of the product was compared with that of a product containing no carbon black. The results are shown in Table 6. A deterioration in the flame-retarding property occurred upon adding carbon black.

Table 2

| PP (wt. %) | Mag. hydroxide (wt. %) | Carbon powder Type | Wt. part | ASTM D 635 | UL vertical test thickness 3.2 mm | 2.5 mm | 2.0 mm |
|---|---|---|---|---|---|---|---|
| 65 | 35 | — | 0 | comb. | — | — | — |
| 65 | 35 | carbon black (furnace black 30 m$\mu$m) | 4.0 | self-extinc. | — | — | — |
| 55 | 45 | — | 0 | comb. | 94 HB | — | — |
| 55 | 45 | carbon black (furnace black 30 m$\mu$m) | 3.5 | self-extin. | 94 V-1 | — | — |
| 55 | 45 | " | 5.5 | no-flame | 94 V-1 | — | — |
| 45 | 55 | — | 0 | — | 94 V-1 | 94 HB | — |
| 45 | 55 | carbon black (furnace black 30 m$\mu$m) | 0.5 | — | 94 V-0 | 94 V-1 | — |
| 45 | 55 | carbon black (channel black 100 m$\mu$m) | 0.5 | — | 94 V-0 | 94 V-1 | — |
| 45 | 55 | active carbon (50 m$\mu$m) | 0.5 | — | " | " | — |
| 45 | 55 | graphite (1 $\mu$m) | 0.5 | — | " | " | — |
| 45 | 55 | silica gel *1 | 0.5 | — | " | " | — |
| 45 | 55 | silica gel *2 | 0.5 | — | " | " | — |
| 35 | 65 | carbon black (furnace black 30 m$\mu$m) | 0 | — | — | — | 94 HB |
| 35 | 65 | " | 0.05 | — | — | — | 94 V-1 |
| 35 | 65 | " | 3.0 | — | — | — | 94 V-0 |

PP: polypropylene
Mag. hydroxide: magnesium hydroxide
Note:
*1 silica gel: average diameter 50 m$\mu$m specific surface area 90 m$^2$/g
*2 silica gel: average diameter 35 m$\mu$m specific surface area 110 m$^2$/g.

The average diameters of the carbon powders are given next to the types of the carbon powders.

Table 3

| Composition | | | Combustibility |
|---|---|---|---|
| thermoplastic resin wt. % | magnesium hydroxide wt. part | carbon black wt. part | UL vertical test 3.2 mm thickness |
| HDPE 50 | 50 | 0 | 94 HB |
| 50 | 50 | 1 | 94 V-1 |
| Polypropylene 50 | 50 | 0 | 94 HB |
| 50 | 50 | 1 | 94 V-1 |
| P.E. block copolymer 50 | 50 | 0 | 94 HB |
| 50 | 50 | 1 | 94 V-1 |
| ABS 50 | 50 | 0 | 94 HB |
| 50 | 50 | 1 | 94 V-1 |
| Polystyrene 50 | 50 | 0 | 94 HB |
| 50 | 50 | 1 | 94 V-1 |

Note:
HDPE: high density polyethylene
P.E. block copolymer: propylene-ethylene block copolymer Table 4

| Composition | | | | Combustibility |
|---|---|---|---|---|
| P-E copolymer (wt. %) | Inorganic filler Type | wt. % | Carbon black wt. % | UL vertical test 3.2 mm thickness |
| 50 | magnesium hydroxide | 50 | 0 | 94 HB |
| 50 | | 50 | 1 | 94 V-1 |
| 50 | aluminum hydroxide | 50 | 0 | 94 HB |
| 50 | | 50 | 1 | 94 V-1 |
| 50 | complex of | 50 | 0 | 94 HB |

Table 4-continued

| P-E copolymer (wt. %) | Composition | | Carbon black wt. % | Combustibility UL vertical test 3.2 mm thickness |
|---|---|---|---|---|
| | Inorganic filler | | | |
| | Type | wt. % | | |
| | magnesium hydroxide and magnesium carbonate | 50 | 1 | 94 V-1 |

P.E. copolymer: propyrene-ethylene copolymer

Table 5

| Composition | Method of blending carbon black | Combustibility JL vertical test 3.2 mm thickness |
|---|---|---|
| Carbon black 2 wt. parts | ① | 94 V-1 |
| | ② | 94 V-1 |
| | ③ | 94 V-1 |
| No carbon black | — | 94 HB |

Table 6

| Carbon black *1 (wt. parts) | Combustibility | |
|---|---|---|
| | UL vertical test 3.2 mm thickness | ASTM D 635 |
| 0 | 94 V-1 | no flame |
| 2 | 94 HB | self-extinction |
| 7 | 94 HB | flammable |

Note:
The amount of carbon black is relative to 100 wt. parts of the total of polypropylene, antimony trioxide and chlorinated paraffin.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A self-extinguishing resin composition which prevents the formation of a silver-colored streak when extrusion-molded or injection-molded which comprises:
55 – 25 wt. % of a thermoplastic resin and 45 – 75 wt. % of magnesium hydroxide, wherein when said resin is extrusion-molded, the specific surface area of magnesium hydroxide is selected within the ranges of 38 – 45 $m^2/g$ when said resin has a melt index of more than 8 g/10 minutes;
40 – 33 $m^2/g$ when said resin has a melt index of 8 – 4 g/10 minutes;
36 – 28 $m^2/g$ when said resin has a melt index of 4 – 1 g/10 minutes; and
35 – 25 $m^2/g$ when said resin has a melt index of 1 – 0.1 g/10 minutes; and wherein,
when said resin is injection-molded, the specific surface area of magnesium hydroxide is selected from the ranges of 30 – 22 $m^2/g$ when said resin has a melt index of more than 10 g/10 minutes;
25 – 18 $m^2/g$ when said resin has a melt index of 10 – 6 g/10 minutes;
22 – 10 $m^2/g$ when said resin has a melt index of 6 – 3 g/10 minutes; and
less than 20 $m^2/g$ when said resin has a melt index of 3 – 1 g/10 minutes.

2. The self-extinguishing resin composition of claim 1, wherein said thermoplastic resin is a polyolefin.

3. The self-extinguishing resin composition of claim 1, wherein said thermoplastic resin is polypropylene, propylene-ethylene copolymer or high-density polyethylene.

4. The self-extinguishing resin composition of claim 1, wherein 0.05 – 20 wt. parts of a fine carbon powder having an average particle size diameter of 1m$\mu$m – 10$\mu$m is blended for each 100 wt. parts of the total of the thermoplastic resin and magnesium hydroxide thereby improving the flame retarding property of the composition.

5. The self-extinguishing resin composition of claim 4, wherein the range of the fine carbon powder having an average particle size diameter of 1m$\mu$m – 10$\mu$m is 0.10 – 5 wt. parts for each 100 wt. parts of the total of the composition.

6. A process of extrusion molding a thermoplastic resin composition wherein the self-extinguishing resin composition of claim 1 is used.

7. A process of injection molding a thermoplastic resin composition wherein the self-extinguishing resin composition of claim 1 is used.

* * * * *